United States Patent [19]

Alasia

[11] 4,092,654
[45] May 30, 1978

[54] ENCODING SYSTEM

[76] Inventor: Alfred V. Alasia, 146-07 Thirteenth Ave., Whitestone, N.Y. 11357

[21] Appl. No.: 722,532

[22] Filed: Sep. 13, 1976

[51] Int. Cl.² .................. G03B 35/00; G02B 27/22
[52] U.S. Cl. .................. 354/112; 354/115; 350/130; 352/43; 353/10; 355/22
[58] Field of Search .................. 354/112, 115, 80; 352/43, 57, 58, 86; 350/130, 144; 353/7, 10; 355/22, 75

[56] References Cited

U.S. PATENT DOCUMENTS

| 3,731,606 | 5/1973 | Geoffray | 354/112 X |
| 3,781,104 | 12/1973 | Dubuisson | 355/22 |
| 3,937,565 | 2/1976 | Alasia | 354/112 X |

Primary Examiner—L. T. Hix
Assistant Examiner—M. L. Gellner
Attorney, Agent, or Firm—Schiller & Pandiscio

[57] ABSTRACT

An improved camera and process of coding images and a product produced thereby is described in which an image of graphics is scrambled by operation of a pseudoscopic camera. The graphics and focal plane-type shutter are moved simultaneously relative to an objective lens and a graticule so as to produce an image of the graphics which will appear inchoate to ordinary vision. The image can be unscrambled by viewing the same through a graticule of the same nature as that used in the scrambling process.

18 Claims, 8 Drawing Figures

ENCODING SYSTEM

This invention relates to coding and decoding graphics and more particularly to a system and method of producing scrambled or coded images, typically in printed form and for decoding the same.

The term "graphics" as used herein shall mean an object of which a photographic image can be formed and generally includes two and three dimensional objects including photographs, patterns, logos, figures, indicia, line work including alpha-numeric characters, signatures, solids, continuous tone and half-tone materials, etc.

In U.S. Pat. No. 3,937,565 issued on Feb. 10, 1976, on Process of Coding Indicia and Product Produced Thereby, I described a system and method of coding an image of graphics so that the image cannot be easily recognized nor reproduced and cannot be readily decoded without specific knowledge of the particulars of the encoding process. The system and method described employs an autostereoscopic camera for photographing the artwork so as to produce a parallax panoramagram. Specifically, the camera includes a lenticular screen whereby a photosensitive element is placed in the combined image plane of the camera formed by the objective lens and lenticular screen. The image of the graphics to be coded is initially focussed on the photosensitive element in the image plane of the camera, with the camera "wide open" so as to provide a relatively small depth of focus. The lens system is then "stopped down" by making the aperture stop of the camera smaller so as to increase the depth of focus. The lenticular screen and photosensitive element are then moved longitudinally along the optical axis of the camera either toward or away from the objective lens of the camera to the edge of but within the limits defining the depth of focus. The shutter of the camera is opened to expose the photosensitive element to the light projected from the graphics. During exposure, the lenticular screen and photosensitive element are moved together relative to the objective lens of the camera to expose successive portions of the photosensitive element underlying the screen. The relative movements are such that the point image of the subject center of the graphics will be recorded in the center of the photosensitive element as a blurred spot which is moved progressively in the course of the relative movement of the objective lens, lenticular screen and photosensitive element.

The resulting images formed on the photosensitive element is a lenticular dissection of the image of the graphics as well as an image in which the displacement between the subject center and the second conjugate point introduces a scrambling factor. The scrambled image is essentially unrecognizable and cannot readily be identified by unaided vision.

In order to reconstruct, unscramble, or decode the scrambled image, a second transparent lenticular screen of the same nature as the first screen used in the coding process is employed. The second screen is registered, i.e., the lenticules of the screen are oriented in a direction so that they are in the same relationship to the scrambled image as the first screen was positioned to the photographic image of the original graphics. Once the second screen is properly registered, the viewer can easily see the unscrambled image by looking through the second screen.

Although this process and system may be satisfactory for relatively small scale production, the relatively long exposure time necessary to expose each photosensitive element in the autostereoscopic camera inhibits large scale production of scrambled imaging photographic reproduction. Additionally, since each photosensitive element is exposed within the depth of focus but spaced from the image plane, even though the scrambled image when decoded is discernable, it will not be in sharp focus as it would be had exposure of the photosensitive element occurred in the image plane. Further even though the scrambled image is difficult to discern with the unaided eye, variations in shading and contrast of the scrambled image suggests that a scrambled image is present.

Objects of the present invention therefore are to provide an image coding or scrambling system, process and product made by the process which are improvements over the system, process and product described in my U.S. Pat. No. 3,937,565; which require relatively short exposure times for each artwork enabling relatively large scale production of scrambled printed sheets with relatively sharper images, and which provides a scrambled image having relatively less contrast and shading making it more difficult to recognize with unaided vision.

To effect the foregoing and other objects of the present invention, the scrambled image is preferably produced photographically in a manner which scrambles the image of the artwork, so that it cannot be directly identified, by using a camera such as a pseudoscopic camera, the latter being well known in the art.

Pseudoscopic cameras of the type used in carrying out the principles of the present invention generally include an objective lens, preferably corrected to have a flat field (generally defined as that surface in which the sharpest images are formed by a lens system when the viewed object is at infinity or the loci of all points of collimated light imaged by the lens system). In order to reduce or substantially eliminate marginal rays so as to improve image quality an aperture stop, preferably in the form of an elongated slit, is utilized to form a slit lens. The slit should be wide enough to avoid severe diffraction and to allow enough light through the lens to form an image. The length of the slit is preferably equal to the width of the lens. The "slit lens" may be any one of several types of lenses. For example, the slit lens may take the form of a simple convex-convex lens which is provided with a light-opaque mask having a slit, preferably horizontally oriented, in front of the lens. Alternatively, the slit lens may be a relatively small elongated block-shaped lens having at least one curved surface so that the lens can be horizontally-positioned along its elongate direction with its curved surface focussing the incoming rays to the image plane (defined as that surface, generally referred to as a plane at which a lens system forms the sharpest image of the object which is at some position in front of the lens system) of the camera. Accordingly the term "the elongate direction of the slit lens" shall include hereafter the elongate direction generally defined by the slit of the mask or the elongate direction of the block shaped lens depending upon the type of lens used.

The graticule can be in the form of a grid comprising narrow, substantially parallel opaque strips separated by narrower transparent strips, or preferably in the form of a lenticular screen comprising substantially elongated, parallel, contiguous, hemi-cylindrical lenticules. The graticule is located between the slit lens and the image plane closely adjacent the image plane. The strips or hemi-cylindrical lenticules are normally oriented in a direction perpendicular to the elongate direction of the slit lens, so that where the slit is horizontal the strips or lenticules of the graticule are vertically oriented. Further, the camera includes a focal plane-type shutter, positioned either directly in front of or directly behind the objective lens. Such a shutter is usually an opaque curtain having an elongated slit, normally oriented parallel with the strips or lenticules of the graticule and movable so that the slit travels in a direction parallel (preferably horizontally) to the elongated direction of the slit lens. A photosensitive element such as a sensitized film is positioned at the combined image plane of the graticule and objective lens. During exposure of the preferred camera, the focal plane-type shutter is operated so that the vertical slit of the shutter travels horizontally across the plane of the shutter so as to expose successive portions of the photosensitive element. Since the objective lens is a slit lens with the elongate direction of the slit transversely oriented with respect to the slit of the shutter, movement of the shutter has the effect of moving a square aperture across the width of the objective lens. As the slit of the shutter moves the angle of view of the object changes which in turn changes the angle of acceptance through the graticule.

Due to the spacing between the lens surfaces or strips of the graticule, a light ray from a point near the center of the subject or scene photographed (hereinafter called the "subject center") passing through the nodal point of the objective lens will fall upon the photosensitive element at progressively different points as the slit of the focal plane shutter is moved, so that different aspects of the subject are presented to the lens and recorded by the photosensitive element as a parallax panoramagram.

In accordance with the present invention, the means are provided for moving the subject transversely to the optic axis of the lens when the shutter is operated. This produces a photographic image which is not only a lenticular dissection of the image but one in which the displacement of each point of the image of the subject is moved through a loci of points in the image plane so as to introduce a scrambling factor. As in my prior U.S. Pat. No. 3,937,565, this scrambled image can be recorded on film, preferably of the self-developing type. If multiple versions of the scrambled indicia are desired, screen positives can then be made from the photographic image provided by the camera, which in turn can be used to prepare a printing plate. The plate can then be used to produce a plurality of printed sheets with the scrambled image.

The scrambled lenticular dissections provided by the process of the present invention are essentially unrecognizable in the sense that the original form of the indicia or pattern cannot be identified by the unaided eye. The scrambled image can be reconstructed in the same manner as described in my U.S. Pat. No. 3,937,565. Specifically, assuming that there has not been any positive or negative magnification of the image during developing and/or printing, the scrambled image is decoded by positioning over the printed or developed image, a transparent lenticular screen of the same nature as that used in the camera in terms of the number of lenticules per inch and the radius of curvature of the lenticules, with the lenticular screen positioned in the same relation to the scrambled image as it was positioned with respect to the original recorded image during the coding process. Alternatively, a viewing screen having a different pitch, i.e., different numbers of lenticules, can be used in decoding the scrambled image by using a viewer which can optically size, i.e. magnify or minify the image to any desired pitch. The scrambled image will thus appear as a blur of variations of shading and contrast when viewed by the unaided eye. In accordance with the present invention, this shading and contrast of the scrambled image can even further be reduced by the utilization of a dot screen, preferably positioned between the lenticular screen and the photosensitive element during exposure of the photosensitive element. The screen is provided with a dot pattern which approximates the tone of the final scrambled image so as to mask the image.

The invention can thus be used for many purposes such as background patterns or documents which must be safeguarded against erasures, forgeries, counterfeiting and the like. The invention may also be used for games and educational purposes where, for example, test answers, scrambled or coded in accordance with the present invention, can be put on the same test sheet as that containing the questions in uncoded form.

Other objects of the invention will, in part, appear obvious and will, in part, appear hereinafter. The invention accordingly comprises the apparatus possessing the construction, combination of elements, and arrangement of parts, the methods comprising the several steps and the relation and order of one or more of such steps with respect to each of the others, and the products possessing the features, properties and relation of elements which are exemplified in the following detailed disclosure and the scope of the application all of which will be indicated in the claims.

For a further understanding of the nature and objects of the present invention, reference should be had to the following detailed description taken in connection with the accompanying drawings wherein.

Figure 1:
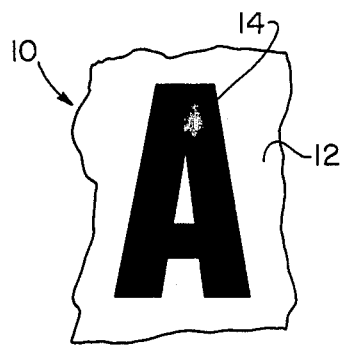
FIG. 1 illustrates an example of an original or unscrambled artwork.

Referring to the drawings, wherein like numerals refer to like parts, FIG. 1 illustrates an example of an original or unscrambled graphics or artwork which can be used with the present invention. The artwork is shown as a pictorial design 14, disposed in any known manner on sheet 10, the latter having contrasting background 12. The minimum contrast required between design 14 and background 12 is dependent on lighting conditions under which the image of design 14 is to be recorded as well as the sensitivity of the photosensitive surface of the photosensitive element 26 on which the image of the design is to be recorded.

FIG. 2 shows schematically, the prior art camera 18 of the type described modified in accordance with the present invention. More specifically, the prior art camera includes objective slit lens 20, graticule 24 and shutter 22 for recording an image on photosensitive element 26.

Although the objective slit lens 20 is shown for purposes of clarity only as a single simple convex-convex lens, it should be understood that the objective lens may comprise any type of slit lens including a single lens or combination of lenses or any other devices known which are capable of converging incoming light, such as the elongated block-shaped lens previously described, so that the light will be focused as an image in the image plane of the lens system. As shown lens 20 further includes a light opaque mask 28 positioned adjacent to and preferably on the surface of the convex-convex lens. The mask 28 defines a light transmitting elongated slit 30 which in the preferred embodiment extends across the surface of the lens in a horizontal direction.

Figure 2A:
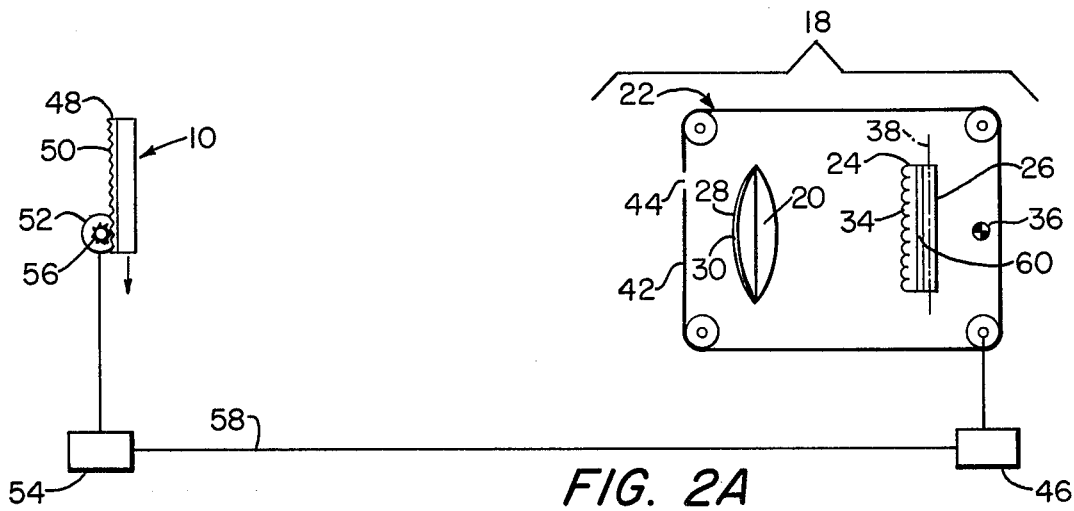
FIGS. 2A, 2B and 2C are top views, in schematic form, of a camera system of the present invention showing the technique employed for forming a photographic scrambling image of the artwork of FIG. 1.
Figure 2B:
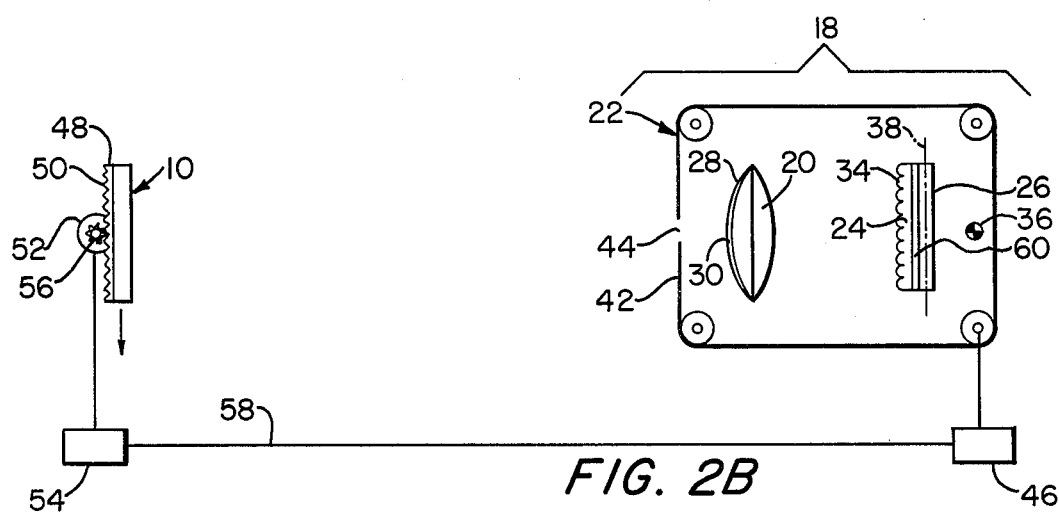
Figure 2C:
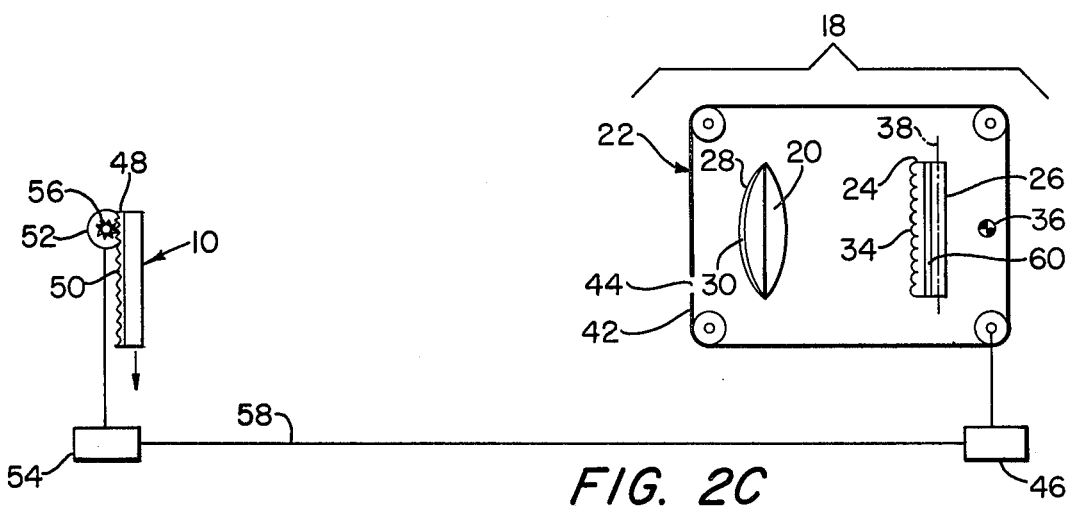

In the preferred embodiment, graticule 24 is in the form of a lenticular screen which comprises substantially unidirectional contiguous elongated cylindrical lenticules 34. The number of lenticules per inch, the orientation and the radius of curvature of the lenticules is a matter of choice, although as described in greater detail below, such factors must be known since they are critical in decoding or unscrambling the coded image which is being recorded. It should be understood therefore that the lenticules of other configurations, such as spherical lenticules, can be used so long as the specific configuration is known so that the image can be decoded. In the preferred embodiment the unidirectional lenticules are oriented in a vertical direction perpendicular to the direction of the slit 30 of mask 28. As well known in the art a lenticular screen of the type described will act as a converging lens and thus when screen 24 is disposed between lens system 20 and the focal point of the lens system, the combined lens system 20 and screen 24 will focus the light at the new combined focal point, referred to at 36. As mentioned above, an image of an object being focused by slit lens 20 and screen 24 will be focused in an image plane. This image plane will move from the focal plane (which passes through the focal point 36) toward the screen 24 as the artwork object being viewed moves from infinity toward the camera. Thus, as shown in FIGS. 2A, 2B and 2C when the artwork 10 is positioned in front of the camera at some finite distance, the image will be focused in the image plane generally referred to at 38.

The shutter 32 is preferably of the focal plane type including curtain 42 formed with slit 44. The shutter is positioned and the slit is transversely oriented with respect to the elongate direction of slit 30 of the lens 20, preferably in a vertical direction, so that the slit moves horizontally across the optical axis either directly in front of or behind the lens 20 when shutter 22 is driven by shutter drive mechanism 46. The latter is well known to those skilled in the art and thus will not be described in great detail.

The photosensitive element 26, which may be photographic film of the self-developing type or the like, is positioned with screen 24 behind shutter 24 with element 26 in image plane 38. In this way, the camera is said to be in focus in which an image of artwork 10 can be recorded on element 26.

In accordance with the present invention the camera is modified to further include means for moving artwork 10 simultaneously with shutter 24 relative to slit lens 20. The means can comprise any type of device for moving graphics 10 and can for example, as shown, include a platform 48 for supporting graphics 10. Platform 48 is provided with a rack gear 50. A motor 52, the operation of which is controlled by motor drive mechanism 54 rotates pinion gear 56, the latter engaging rack gear 50. Thus, operation of motor 52 moves graphics 10 along a path relative to slit lens 20. Motor drive mechanism 54 can be synchronized with shutter drive mechanism 46 as indicated generally by numeral 58 in any known manner in the art, such as by differential gearing through a suitable drive train, or by electrical means. Although it is preferred that graphics 10 travels along a path essentially parallel to the elongate direction of the slit lens it will be appreciated that the path does not have to be parallel to the elongate direction of the slit lens nor does the path have to be unidirection but can be curved or even in the opposite direction to the direction at which the slit of the shutter moves so long as the direction is transverse to the optical axis of the system. Further, the speed at which the graphics moves need not necessarily be proportional to the speed at which the slit of the shutter moves.

Referring to FIGS. 2A, 2B and 2C the operation of camera 18 as well as the method of the present invention is illustrated in sequence. Initially, an image of the graphics 10 is focused on photosensitive element 26 in image plane 38. Shutter drive mechanism 34 is then operated so that the slit 44 of the shutter 22 moves in a direction parallel to slit 30 of the slit lens 20. Simultaneously, graphics 10 also moves in a direction substantially parallel to the direction in which the slit of the shutter moves. As the slit of the shutter moves horizontally across the plane of the shutter through the successive first, second and third positions shown in FIGS. 2A, 2B and 2C respectively, successive portions of photosensitive element 26 are exposed. Since the slit lens is defined by a horizontal slit, movement of the shutter has the effect of a relatively small substantially square aperture which moves across the objective lens. Due to the spacings between the lenticules 34 of the screen 24, and the movement of the graphics during exposure, a photographic image is provided on the photosensitive element 26 which is not only a lenticular dissection of the image, but one in which the displacement of each point of the image of the artwork through a loci of points in the image plane introduces a scrambling factor.

Figure 3:
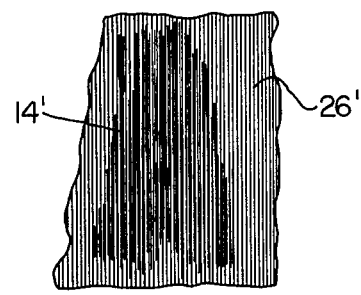
FIG. 3 illustrates the scrambled image of the artwork as provided by the method of the present invention.

The photosensitive element 26 once exposed, can then be processed so that a screen positive can be made as described in my U.S. Pat. No. 3,937,565. As stated therein the positive is then used to prepare a printing plate which in turn is used to print sheet material 26' shown in FIG. 3 as having a coded or scrambled image 14' printed thereon. The printing plate may also be made from the negative of element 26 and that other printing systems can be employed to produce printed multiple versions of the coded images on sheet material. As shown in FIG. 3, the scrambled image 14' thus printed, is essentially unrecognizable and cannot be identified by unaided vision. Even though the scrambled image is unrecognizable, nevertheless, there are variations in contrast which would indicate the presence of some type of image. Accordingly, and in accordance with the present invention, this contrast can be substantially reduced so as to further make it difficult to recognize the scrambled image without the use of a lenticular screen and without effecting the decoding process of the image. Specifically, in accordance with the present invention, a dot screen 60 is preferably positioned between lenticular screen 22 and photosensitive element 26 during exposure of the photosensitive element. Preferably the screen 60 is secured to the back of graticule 24. This screen is provided with a dot pattern which approximates the tonal pattern of the image to be provided so as to mask the formed image. Such screens are well known in the art for use in lithography for printing half tone prints from continuous tone prints. The screens of the type used herein are described as "halftone plates" in volume 10 of McGraw-Hill Encyclopedia of Science and Technology, (1960), McGraw-Hill Book Company, Inc. pp. 611 and 612. Typically, the dots are provided by a transparent plate having a first array of etched parallel lines extending transversely to a second array of etched parallel lines resulting in the formation of what appears to be a dot pattern of, for example, 10,000 dots per square inch. Generally, the screen 60 provides an overall tint which will cause the dissected and scrambled image to blend in with the background of the printed sheet so that imaging screen 60 on photosensitive element 36 with the scrambled image has the effect of masking the image.

Figure 4:
FIG. 4 is an enlarged partial cross-section of the lenticular screen.

As shown in FIG. 4, in order to reconstruct, unscramble or decode the scrambled image 14', whether dot screen 60 is used in the coding process or not, a transparent lenticular screen 24' is employed in the same manner as described in my U.S. Pat. No. 3,937,563. Assuming that there has been no magnification, either positive or negative of the printed form of the scrambled image with respect to the photographic image, the screen 24' is of the same nature as the screen 24 used in the camera 18 in terms of the same nature as the screen 24 used in the camera 18 in terms of the number of cylindrical lenticules 34' per inch and the radius of curavture of the lenticules. The optical thickness of the screen 34' is made as thick as the optical distance from the lenticulated surface of the screen 24 to the photosensitive surface of element 26 when the photographic image was formed.

Figure 5:
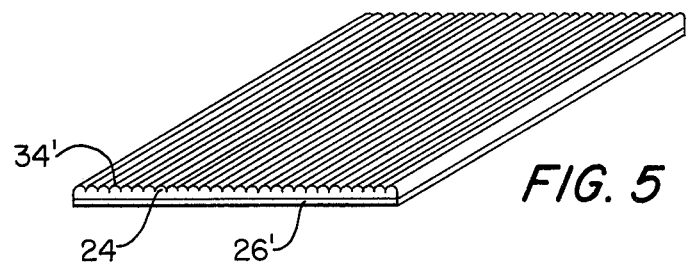
FIG. 5 shows the method of decoding the printed scrambled indicia using a transparent lenticular screen.
Figure 6:
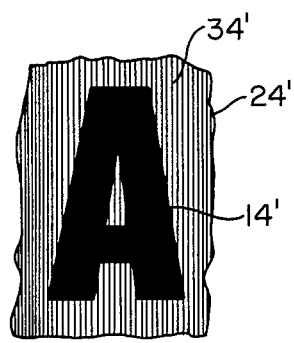
FIG. 6 illustrates the decoded or unscrambled indicia as it appears to the viewer through the lenticular screen of FIG. 4.

As shown in FIG. 5, by registering the lenticular screen 24', i.e. orienting the direction of the lenticules 34' in the same relationship to the scrambled image 14' as the screen 24 was positioned to the photographic image from which the printing plates were made, the image 14' can be reconstructed, decoded or unscrambled as illustrated in FIG. 6.

It should be realized that the scrambled image 14' cannot be easily reproduced. Such reproduction would not only require the same camera 18 and knowledge of the original artwork 10, but also, interalia, knowledge of the distance of the artwork is placed from the camera, the orientation of the lenticules 34 of screen 24, and the length and path directions of artwork 10. Without this knowledge, any attempted reproduction of the scrambled image would be subject to detection.

It is noted that the longer the path over which artwork 10 moves during exposure, the greater the scrambling factor will be, i.e. the more difficult it will be to determine from the scrambled image the nature of the original unscrambled image. However, increasing the path length over which artwork 10 moves during exposure, decreases the angle of acceptance (the angle relative to the perpendiculra of the plane in which the image lies) through which the image can be viewed through lenticular screen 26. Further, the amount of scrambling can also be controlled by the resolution of the photosensitive element, the number of lenticules per inch, the complexity of the subject, etc.

The invention thus described provides a camera and technique which is much faster then that described in my prior U.S. Pat. No. 3,937,565 since the exposure time of the photosensitive element 26 using the pseudoscopic camera 18 of the present invention is relatively short in comparison to the excursion time required by a conventional autostereoscopic camera. Further, since the artwork is focussed on the photosensitive element during exposure, the resluting image will be superior in sharpness in comparison to the image provided by my prior art process of moving the photosensitive element away from the image plane. Finally, the use of dot screen 60 further reduces the contrast between the scrambled image and the background of the printed sheet.

While a particular preferred embodiment of the invention has been described, it will be understood that various change and modifications can be made from the foregoing without departing from the spirit and scope of the claims. For example, if a further scrambling factor is desired, and the sharpness of the image is not critical, the camera can be stopped down and the photosensitive element can be moved away from the image plane to a position within the depth of focus prior to exposure. Alternatively, the scrambling factor can be increased by moving the graticule 24 relative to the slit lens during exposure of the photosensitive element 26.

What is claimed is:

1. A three-dimensional imaging camera system for forming parallax panoramagrams of a subject, and comprising, in combination:
    lens means having a focal plane;
    means for defining a slit;
    a graticule disposed adjacent said focal plane so as to form with said lens means a combined focal plane;
    selectively operable exposure means for permitting formation, in operative cooperation with said means for defining a slit, an image of said subject at said combined focal plane;
    supporting means for supporting said subject; and
    means for moving said supporting means relative to said means for defining a slit, synchronously with the operation of said exposure means so as to provide an effective scanning aperture across said image plane and so as to simultaneously permit said formation of said image.

2. A camera system in accordance with claim 1, wherein said lens means and said means for defining a slit are formed by a slit lens.

3. A system in accordance with claim 1, wherein said exposure means and means for defining a slit are constituted by a focal plane-type shutter positioned adjacent to said lens means.

4. A three-dimensional imaging camera system for forming parallax panoramagrams of a subject, and comprising in combination:
    an objective lens having a focal plane;
    a graticule disposed adjacent said focal plane;
    a focal plane-type shutter positioned adjacent to said objective lens and operable for permitting formation of an image of said subject at the combined image plane of said graticule and lens and for providing an effective scanning aperture across said image plane;
    means for supporting said subject; and
    means for moving said supporting means synchronously with operation of said shutter so as to permit the formation of said image.

5. A camera in accordance with claim 4 wherein said graticule comprises a plurality of parallel contiguous elements oriented in a first direction, and said means for moving said subject is adapted to move said subject transversely to said first direction.

6. A camera in accordance with claim 5 wherein said graticule is a lenticular screen.

7. A camera in accordance with claim 5 wherein said lens is a slit lens and said elements of said graticule are oriented transversely to the elongate direction of said slit lens.

8. A camera in accordance with claim 7 wherein said shutter includes an elongated slit the direction of elongation of which is oriented transversely to the elongated direction of said slit lens.

9. A camera in accordance with claim 1 including
a half tone screen positioned between said objective lens and said image plane and having a pattern of dots for masking said image.

10. A camera in accordance with claim 9, wherein the pattern of dots is such as to provide a similar tone as said image.

11. A process of producing a parallax panoramagram of a coded or scrambled form of a subject using a camera of the type having an objective lens having a focal plane, a graticule positioned adjacent said focal plane and a focal plane-type shutter movable with respect to said lens for exposing said focal plane to light traversing said lens and for providing an effective scanning aperture across said image plane, said process comprising:
moving said focal plane-type shutter to image said subject within the depth of focus of said graticule and lens;
synchronously moving said subject transversely to the optical axis of said lens with motion of said focal plane shutter forming an image within said depth of focus; and
exposing a photosensitive element to said formed image within said depth of focus.

12. A process in accordance with claim 11 wherein said graticule is a lenticular screen having a plurality of parallel hemicylindrical lenses.

13. A process in accordance with claim 12 further including the steps of:
developing the exposed photosensitive element to provide a permanent image, and
forming a plurality of duplicate images of said permanent image.

14. A process in accordance with claim 11 wherein said lens is a slit lens and said graticule is provided with parallel contiguous elements oriented in a direction transversely to the elongated direction of said slit lens, and said step of moving said focal plane shutter includes the step of moving the slit of said shutter transversely to the direction of orientation of said contiguous elements.

15. A process of decoding the parallax panoramagram made in accordance with claim 13, including the step of:
registering over said panoramagram, the lenticules of a second lenticular screen having the same spatial distribution and radius of curvature as the lenticules of said first mentioned screen.

16. A process in accordance with claim 15 wherein said step of moving said subject is along a path parallel to the elongated direction of said slit lens.

17. A process in accordance with claim 11, wherein said step of moving includes the step of imaging said subject at the combined image plane of said graticule and lens, and said step of exposing a photosensitive element includes the step of exposing said photosensitive element at said image plane.

18. A sheet having a coded or scrambled form of an original artwork pattern made in accordance with the following steps:
forming an image of said original artwork pattern in the combined image plane of a three-dimensional camera having a slit lens and a graticule having a plurality of parallel contiguous elongated elements; and
exposing a photosensitive element to said image while simultaneously moving said original artwork pattern and the slit of a focal plane-type shutter of said camera in a plane adjacent said slit lens, each transversely to the elongated direction of said graticule elements.

* * * * *